(12) United States Patent
Bhaumik et al.

(10) Patent No.: US 7,034,478 B2
(45) Date of Patent: Apr. 25, 2006

(54) DIGITAL SPINDLE CONTROL ARCHITECTURE

(75) Inventors: Jaydip Bhaumik, Rosemount, MN (US); Jason P. Brenden, Woodbury, MN (US); Dames A. Dahlberg, Eagan, MN (US); Michael Peterson, Eagan, MN (US); Ross Wilson, Menlo Park, CA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 10/955,981

(22) Filed: Sep. 30, 2004

(65) Prior Publication Data

US 2006/0066280 A1 Mar. 30, 2006

(51) Int. Cl.
*H02P 6/18* (2006.01)
*H02P 6/14* (2006.01)

(52) U.S. Cl. ............... 318/254; 318/439; 318/138; 318/801; 318/802; 318/803; 318/804; 318/805; 318/806; 318/807; 318/808; 318/809; 318/810; 318/811

(58) Field of Classification Search ............... 318/138, 318/439, 254, 801–811
See application file for complete search history.

(56) References Cited

U.S. PATENT DOCUMENTS

| | | | |
|---|---|---|---|
| 5,543,697 A | | 8/1996 | Carobonlante et al. |
| 5,631,999 A | | 5/1997 | Dinsmore |
| 5,744,928 A | | 4/1998 | Tang et al. |
| 5,767,654 A | * | 6/1998 | Menegoli et al. ........... 318/811 |
| 5,789,895 A | * | 8/1998 | Lee .............................. 318/811 |
| 5,898,283 A | * | 4/1999 | Bennett ........................ 318/254 |
| 5,969,491 A | * | 10/1999 | Viti et al. .................... 318/254 |
| 6,023,137 A | * | 2/2000 | Kumar et al. ................ 318/254 |
| 6,252,362 B1 | | 6/2001 | White et al. |
| 6,285,521 B1 | | 9/2001 | Hussein |
| 6,420,847 B1 | * | 7/2002 | Galbiati et al. ............. 318/727 |
| 6,498,446 B1 | | 12/2002 | Menegoli et al. |
| 6,515,443 B1 | | 2/2003 | Kelly et al. |
| 6,555,977 B1 | * | 4/2003 | Du et al. ...................... 318/254 |
| 6,580,236 B1 | | 6/2003 | Mitsuda |
| 6,667,598 B1 | | 12/2003 | Shimohara |
| 6,710,568 B1 | | 3/2004 | Fujii |
| 6,754,151 B1 | | 6/2004 | Watt |
| 6,901,212 B1 | * | 5/2005 | Masino ........................ 318/254 |
| 6,906,485 B1 | * | 6/2005 | Hussein ....................... 318/439 |
| 2003/0085682 A1 | | 5/2003 | Hussein |

* cited by examiner

*Primary Examiner*—Rina Duda
*Assistant Examiner*—Elias Hiruy
(74) *Attorney, Agent, or Firm*—Kinney & Lange, PA

(57) ABSTRACT

A three-phase spindle motor has three terminals each driven with pulse width modulated signals. Rotation of the motor is controlled by iteratively measuring an electrical period of the motor, determining a rotational position of the motor, and synchronizing the sinusoidal pulse width modulation of the spindle motor with the measured electrical period. The electrical period of the motor is measured by detecting zero crossings in the a back electromotive force induced at a first terminal of the motor and determining the time between successive zero crossings. The rotation position of the motor is determined based upon the last measured electrical period and a location of last detected zero crossing. The zero crossings are detected by selecting a time window during which the back electromotive force signal is sensed for zero crossings. The time window is selected as a function of the last measured electrical period and the rotational position of the motor.

48 Claims, 5 Drawing Sheets

DIGITAL SPINDLE CONTROL ARCHITECTURE

CROSS-REFERENCE TO RELATED APPLICATION(S)

None.

BACKGROUND OF THE INVENTION

The present invention relates to a motor controller for spindle motors. In particular, the present invention relates to a digital motor controller that employs a frequency-locked loop to control the speed of a three-phase spindle motor for use in a hard disk drive.

The disks of a computer hard disk drive are typically rotated using three-phase brushless spindle motors. These motors generally have a stationary stator containing three phases connected in a "Y" configuration such that all phases share a common center tap. Opposite the center tap, each phase is connected to a terminal through which current is either supplied or sunk by drive circuitry connected thereto. These motors also have a rotatable rotor that contains a plurality of permanent magnet segments.

The disks are mechanically mounted to the rotor and are rotated by energizing selective phases of the stator to induce magnetic fields that interact with the permanent magnet segments in the rotor to cause the rotor and the disks to rotate in the desired direction at the desired operating speed. The selective energizing of phases in the stator in a predetermined sequence is known as commutation of the motor. In a classical six-state commutation mode, each commutation state is defined by one of the three phases being held at a high impedance while current is supplied to a second phase and sunk from a third phase.

The rotation of the motor induces a back electromotive force ("back EMF") voltage at each of the three motor terminals. The back EMF voltage is a generally sinusoidal signal with a period proportional to the electrical rotation of the motor.

Commutation of the spindle motor is controlled by commutation circuitry. To maximize the spindle motor torque, the commutation circuitry attempts to drive the motor in time with the electrical rotation of the motor. This is typically accomplished through use of phase-locked loop circuitry based upon the induced back EMF voltage. The phase-locked loop circuitry compares this back EMF voltage at the unenergized terminal (i.e., the terminal held at a high impedance) to the voltage at the motor's center tap, which is representative of the average voltage of the three terminals. Next, a signal is generated indicative of the zero crossings of the back EMF voltage signal, that is, when the back EMF voltage changes polarity with respect to the voltage at the center tap. This zero crossings signal is then used by the commutation circuitry as a reference for commutation timing.

Pulse width modulation techniques are commonly used to drive, or energize, the hard disk drive spindle motor. A motor controller circuit varies the duty cycle of the driving waveforms to achieve a desired motor current waveform. To minimize unwanted acoustic noise, the motor controller circuit may drive a sinusoidal-shaped current through the motor. Unlike the classic six-state commutation mode in which one terminal is held at a high impedance, commutation using sinusoidal pulse width modulation generally requires that all three phases of the motor be driven simultaneously. Thus, with sinusoidal pulse with modulation, one terminal of the motor is driven to a high voltage while the other two terminals are modulated by being alternately driven to high and low voltages to shape the current through the motor.

It becomes more difficult to detect back EMF voltage when sinusoidal pulse width modulation is used to drive the spindle motor because all three terminals of the motor are simultaneously driven. Accordingly, it becomes necessary to predict an approximate location of the back EMF zero crossing on at least one of the three terminals, and stop driving, or float, the selected motor terminal long enough to detect the zero crossing. This act of floating a terminal is referred to as opening a window, and is generally performed by the motor controller circuitry.

Most phase-locked loops of conventional motor controllers are analog in nature. Such analog approaches, however, generally require expensive external components. Analog motor controllers also have a limited lock range, that is, a limited range of motor rotation rates to which they can synchronize the commutation circuitry. This may restrict the number of hard disk drive types that the motor controller can support.

Attempts to implement the motor controller with digital electronics have either required complex digital circuitry along with significant silicon die area or have sacrificed hard disk drive performance. One performance item that is often sacrificed is the resolution of the sinusoid used to sinusoidally pulse width modulate the motor, which may negatively affect the acoustic noise of the motor. Other performance items often sacrificed include the ability to avoid period jitter, which may negatively affect the read/write electronics, and the ability to reliably and efficiently lock to the motor.

BRIEF SUMMARY OF THE INVENTION

According to an exemplary embodiment of the present invention, a three-phase spindle motor has three terminals each driven with pulse width modulated signals. Rotation of the motor is controlled by iteratively measuring an electrical period of the motor, determining a rotational position of the motor, and synchronizing the sinusoidal pulse width modulation of the spindle motor with the measured electrical period. The electrical period of the motor is measured by detecting zero crossings in the back electromotive force signal induced at a first terminal of the motor and determining the time between successive zero crossings. The rotation position of the motor is determined based upon the last measured electrical period and a location of last detected zero crossing. The zero crossings are detected by selecting a time window during which the back electromotive force signal is sensed for zero crossings. The time window is selected as a function of the last measured electrical period and the rotational position of the motor.

DETAILED DESCRIPTION

Figure 1:
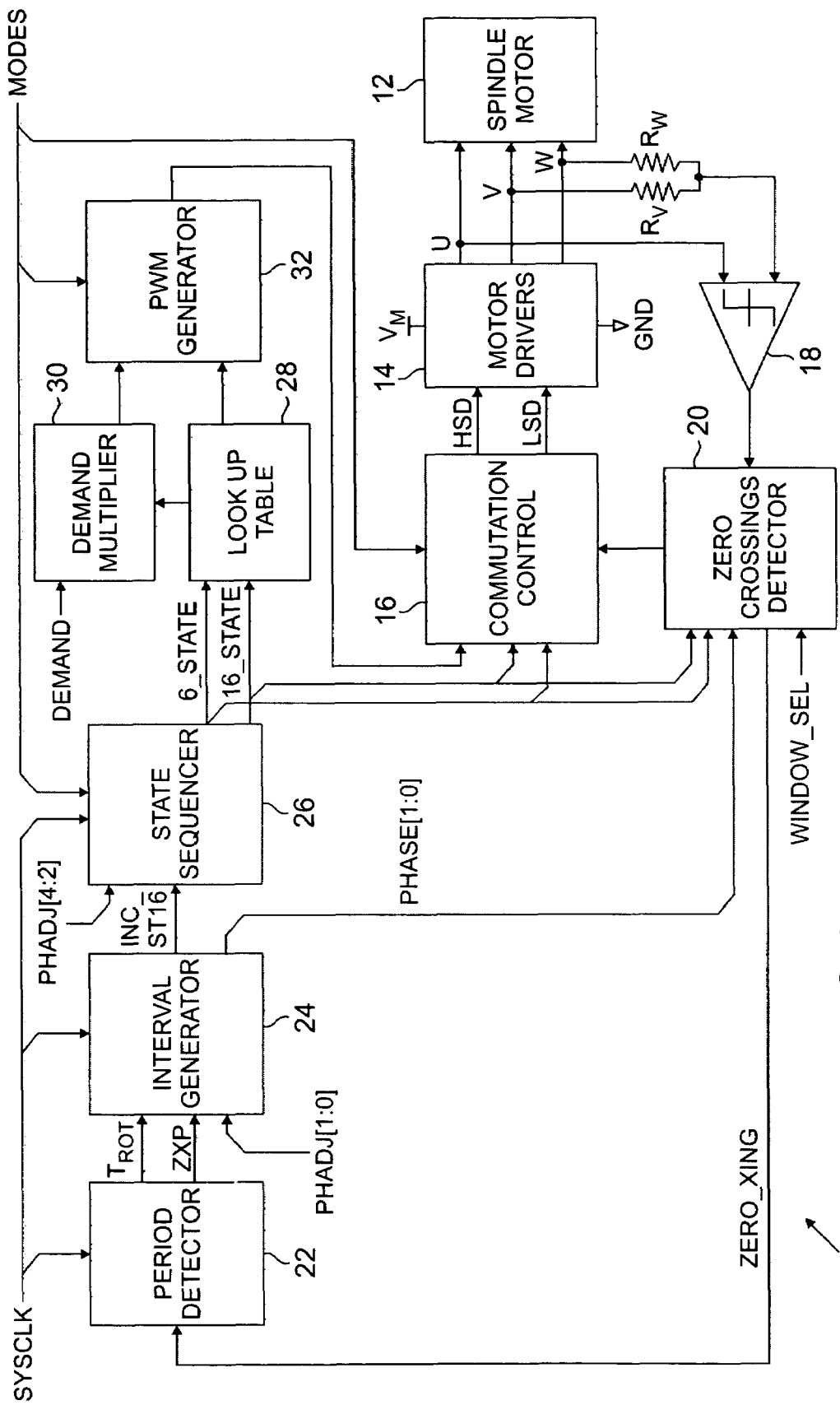
FIG. 1 is a block diagram of a digital motor controller for controlling a hard disk drive spindle motor.

FIG. 1 is a block diagram of digital motor controller 10 for controlling hard disk drive (HDD) spindle motor 12. Motor controller 10 includes motor drivers 14, commutation control 16, resistors $R_V$ and $R_W$, comparator 18, zero crossings detector 20, period detector 22, interval generator 24, state sequencer 26, lookup table (LUT) 28, demand multiplier 30, and pulse width modulation (PWM) generator 32, connected as shown in FIG. 1.

Spindle motor 12 is a three-phase DC motor having three terminals labeled U, V, and W. Motor drivers 14 utilize half bridge switches to connect motor terminals U, V, and W to either motor power supply terminal $V_M$ or ground terminal GND. Commutation control 16 controls motor drivers 14 to generate current having selected waveforms through the windings of motor 12. To minimize acoustic noise, a sinusoidally-shaped current is preferably generated through motor 12.

The rotation of spindle motor 12 will induce a back electromotive force ("back EMF") signal at each of motor terminals U, V, and W. The back EMF signal is a sinusoidal waveform having a period $T_{ROT}$ proportional to the spin rate of motor 12. To detect the back EMF signal at a particular motor terminal, commutation control 16 suspends driving that terminal (i.e., tri-states the terminal such that it is connected to neither motor power supply terminal $V_M$ nor ground terminal GND) during the time in which the back EMF signal is to be detected. At low spin-up rotation speeds of motor 12, the signal-to-noise ratio of the back EMF signal will be too low from which to obtain reliable information, but once motor 12 attains a threshold rotation speed, the signal-to-noise ratio increases enough that meaningful information can be gleaned from the back EMF signal.

Comparator 18 compares the back EMF signal at motor terminal U to the average of the voltages at motor terminals V and W. The average of the voltages at motor terminals V and W is supplied to the input of comparator 18 by supply resistors $R_V$ and $R_W$. Resistors $R_V$ and $R_W$ are each connected between an input of comparator 18 and a respective one of motor terminals V and W, and are selected to have equal values in an exemplary embodiment so as to provide an unweighted average of the voltages at motor terminals V and W to comparator 18. The output of comparator 18 is a square wave signal having a roughly 50% duty cycle and whose rising and falling edges are defined by zero crossings detected in the back EMF signal of terminal U. A zero crossing occurs each time the back EMF signal changes polarity with respect to the average of the voltages at motor terminals V and W. The selection of motor terminal U at which to detect the back EMF signal in the example of FIG. 1 is arbitrary.

Zero crossings detector 20, among other tasks, converts the output signal of comparator 18 into zero crossings signal ZERO_XING, which is a pulse that is multiple SYSCLKs in length that transitions to a high state upon detection of a rising edge in the output signal of comparator 18. In alternate embodiments, transitions may be triggered by a falling edge. As will be described more fully below, the primary function of zero crossings detector 20 is to predict the locations of zero crossings and provide that information to commutation control 16.

Period detector 22 uses zero crossings signal ZERO_XING and external clock signal SYSCLK to detect electrical period $T_{ROT}$ of the back EMF signal of motor terminal U. Period detection circuitry 22 converts zero crossings signal ZERO_XING into zero crossings pulse signal ZXP for use as a storage element load enable signal. Zero crossings pulse signal ZXP has a single clock (SYSCLK) pulse for each rising edge of zero crossings signal ZERO_XING, or one pulse per electrical period $T_{ROT}$. Period detector 22 then measures the time between successive zero crossing pulses.

Figure 2:
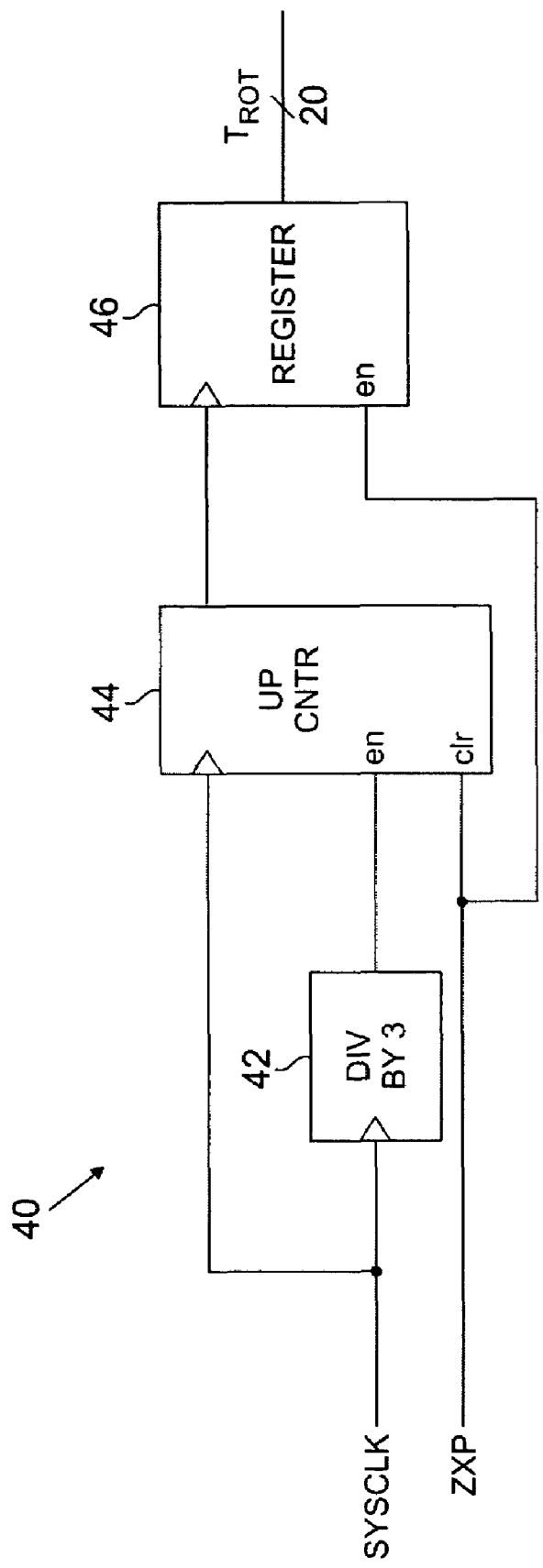
FIG. 2 is a block diagram of an exemplary embodiment of a period capture circuitry for use in the digital motor controller of FIG. 1.

FIG. 2 is a block diagram of an exemplary embodiment of period capture circuitry 40 of period detector 22. Period capture circuitry 40 includes divider 42, period (up) counter 44, and period capture register 46. In this embodiment, external system clock SYSCLK is divided by three by divider 42. A pulse in zero crossings pulse signal ZXP indicates that a zero crossing in the back EMF signal has been detected and restarts (from zero) period counter 44 counting upward at a rate of one-third of external system clock SYSCLK, as provided by divider 42. The next pulse in the zero crossings pulse signal ZXP triggers period capture register 46 to capture the output of period counter 44, which is a 20-bit digital word representative of the last electrical period $T_{ROT}$ of spindle motor 12, and resets period counter 44 to start the next period measurement.

Returning to FIG. 1, interval generator 24 accepts as inputs external clock signal SYSCLK and zero crossings pulse signal ZXP for use in dividing the electrical period $T_{ROT}$ as captured by period detector 22 into a plurality of states for use in commutating spindle motor 12. In the embodiment of FIG. 1, interval generator 24 divides electrical period $T_{ROT}$ into six-states (each approximately one-sixth of electrical period $T_{ROT}$) and each six-state into sixteen-states (each approximately one-sixteenth of a six-state) with additional quarter sixteen-state resolution. Interval generator 24 also accepts the two least significant bits of phase adjust register PHADJ, which is set by an external hard disk drive controller to adjust the phase of the commutation control signals to better lock the commutation circuitry to the rotation of the motor.

Figure 3:
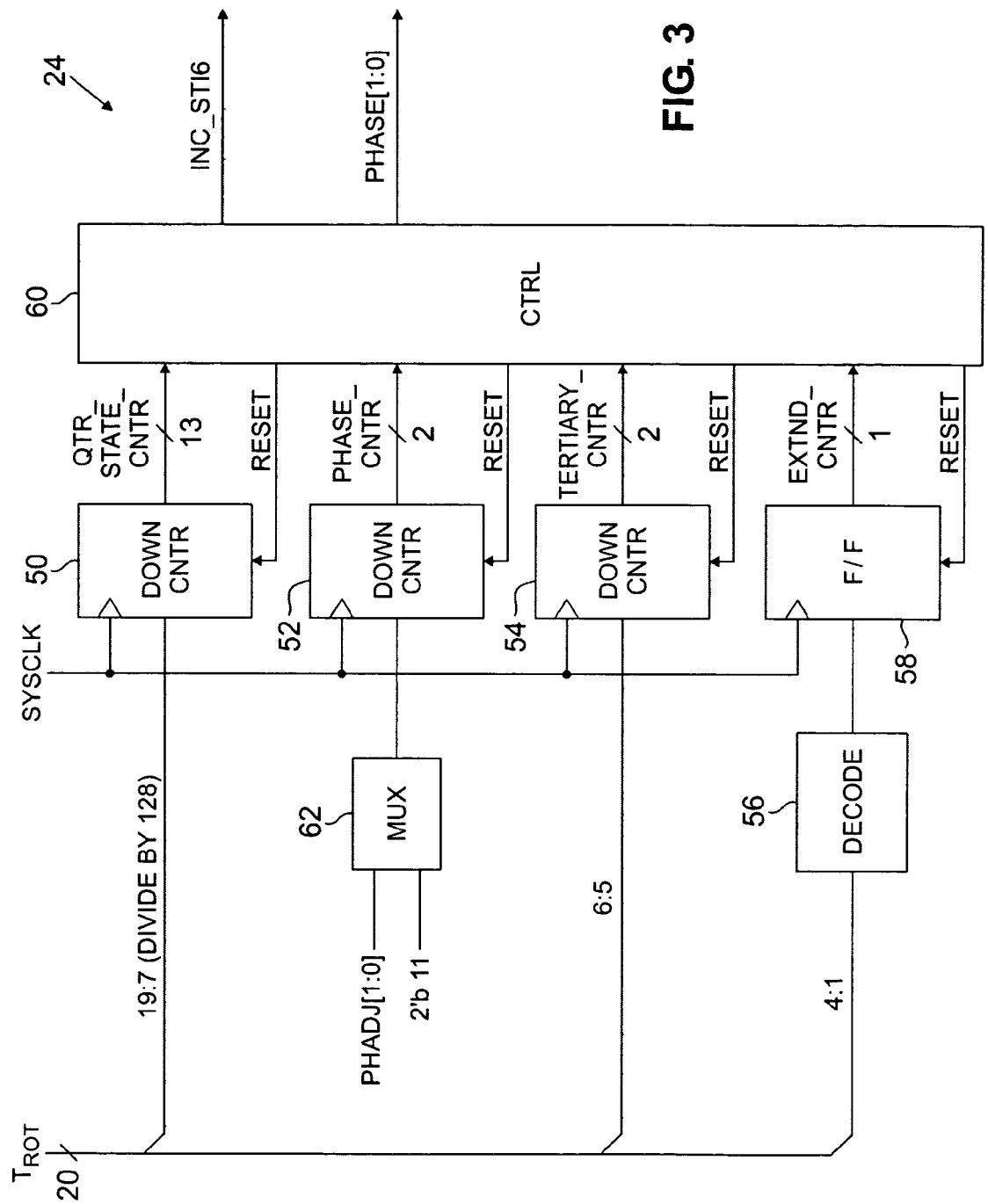
FIG. 3 is a block diagram of an exemplary embodiment of an interval generation circuitry for use in the digital motor controller of FIG. 1.

FIG. 3 is a block diagram of an exemplary embodiment of interval generator 24. Here, interval generator 24 includes quarter state (down) counter 50, phase (down) counter 52, tertiary (down) counter 54, decoder 56, extend counter 58, control block 60, and multiplexer (MUX) 62.

In this embodiment, the last captured electrical period $T_{ROT}$ is a 20-bit digital word made available to interval generator 24 by period capture register 46 of period detector 22. Electrical period $T_{ROT}$ is initially divided by 128 via a right shift of seven bits. This divide by 128 is implemented by providing only bits 7–19 of period capture register 46 to quarter state counter 50. Quarter state counter 50 then counts down from 1/128 of electrical period $T_{ROT}$ at the rate of system clock SYSCLK. Because electrical period $T_{ROT}$ was measured at a rate of one-third of system clock SYSCLK, quarter state counter 50 will have a count-down time equal to electrical period $T_{ROT}$ divided by 384, or 128 times 3. Because 384 also equals 96 times 4, this count-down time is one fourth of a sixteen-state, thus providing quarter sixteen-state resolution.

If the remainder after the divide by 128, represented by the seven least significant bits of period capture register 46, is simply truncated (i.e., discarded) by interval generator 24, the commutation of motor 12 will likely not be synchronized with the rotation of motor 12. If the remainder is simply dropped into the last of the 96 sixteen-states, the last sixteen-state will be significantly larger than the other 95 sixteen-states and the waveform generated for commutating motor 12 will be distorted. In the embodiment of FIG. 3, the remainder is spread out roughly evenly over each of the 96 sixteen-states, thus minimizing distortion of the resultant commutation waveforms.

Quarter state counter 50 must count down four times to generate a single sixteen-state. To spread the remainder amongst the 96 sixteen-states, phase counter 52, tertiary counter 54, and decode logic 56 are loaded with values at the start of each sixteen-state. Phase counter 52 is loaded with either binary three (11) or with the two least significant bits of phase adjust register PHADJ (described below). Tertiary counter 54 is loaded with bits 6 and 5 of period capture register 46. Decode logic 56 receives and evaluates bits 4-1 of period capture register 46 to determine whether to set extend counter 58, which is a flip-flop. Each time quarter state counter 50 reaches zero, phase counter 52 is decremented once. Once both quarter state counter 50 and phase counter 52 have reached zero, the sixteen-state is nominally defined, but then tertiary counter 54 and extend counter 58 begin counting down to extend (hold active) the sixteen-state to include its share of the remainder. Reset signals are provided at appropriate times to each of quarter state counter 50, phase counter 52, tertiary counter 54, and extend counter 58 by control block 60. Each of these counters receives external system clock SYSCLK as a clock.

As described above, phase counter 52 is loaded at the start of each sixteen-state with either binary three (11) or the two least significant bits of programmable phase adjust register PHADJ. Further, phase counter 52 is loaded with the programmable phase adjust register PHADJ once at the beginning of an electrical period, when the ZXP pulse occures. For the rest of the electrical period 52 is loaded with the value binary three (11) at the start of each sixteen-state. The phase counter load selection is made by MUX 62. If binary three is loaded, quarter state counter 50 will count down four times to define a nominal sixteen-state. If PHADJ register is loaded, the quarter state counter will count down one to four times in defining a nominal sixteen-state, thus phase shifting the commutation signals driving motor 12. During operation of motor 12, the motor current phase will be delayed from the motor voltage phase. Phase adjust register PHADJ allows each sixteen-state to be shifted zero to three quarter sixteen-states to better synchronize the commutation of motor 12 with the rotation of motor 12. This synchronization is important for optimizing torque and thereby minimizing the current required to spin motor 12 at a given speed. This programmable phase adjust feature allows the motor current to be precisely aligned with the back EMF signal for maximum torque.

Again returning to FIG. 1, state sequencer 26 is sequentially incremented by increment sixteen-state signal INC_ST16 generated by interval generator 24. The 96 states are broken up into two state machines. The first is a six state machine (ST6) with each six-state approximately equal to one-sixth of the electrical period $T_{ROT}$ of spindle motor 12. The second is a sixteen-state machine (ST 16) with each sixteen-state approximately equal to one-sixteenth of a six-state. State sequencer 26 outputs two digital words: 3-bit 6_STATE word and 4-bit 16_STATE word for use in addressing LUT 28. This state sequencer is initialized to a given state when the zero crossing is detected. The state it initializes to is determined by the PHADJ[4:2] bits. This allows the controller to adjust the driving waveform so that the motor current aligns with the back EMF of the motor to maximize torque and therefore maximize efficiency.

LUT 28 contains the coefficients necessary to create a desired waveform across the windings of motor 12. To minimize acoustic noise, the desired waveform is preferably sinusoidal. Demand multiplier 30 multiplies the coefficients of LUT 28 by the value stored in a programmable demand register (labeled "Demand"). The demand input controls the rotation speed of motor 12; for instance, an increased demand input increases the rotational rate of motor 12.

The multiplied coefficients are then received by PWM generator 32 for generating the PWM signals for use by commutation control 16. As is known in the art, PWM generator 32 generates a PWM signal by digitally comparing a generated ramp or triangle waveform to the multiplied coefficients provided by demand multiplier 30. In one embodiment, an up/down counter may be used to generate a triangle waveform for use by PWM generator 32. The resulting PWM signal will have a duty cycle proportional to the output of demand multiplier 30.

It is not necessary to drive each terminal of motor 12 with a sinusoidal signal to generate a sinusoidal current through each winding of motor 12. Rather, it is possible to generate sinusoidal current using a PWM drive scheme in which, at any given time, one terminal of spindle motor 12 is held either high or low while the other two phases are pulse width modulated. In one embodiment of this scheme, the waveforms used to PWM the terminals will be sequentially made up of six six-states: a rising-shaped six-state, two identical hump-shaped six-states, a falling-shaped six-state, and two constant low-shaped six-states. The PWM signals supplied to the two pulse width modulated terminals will be 120° out of phase with each other. By using this PWM scheme, LUT 28 can generate the signals for all three phases by outputting only two shapes (a rising shape, a humped shape, or a falling shape) at a time. This prevents LUT 28 from having to store three entire phase shifted sinusoidally-shaped waveforms, thereby decreasing the required size of LUT 28 by six times. Further, because the 96 sixteen-states are evenly divisible by six, the coefficients for LUT 28 are relatively easy to create and they allow for sufficient resolution to form the sinusoidal shape with an acceptable level of distortion.

Based upon the current six-state and sixteen-state, as received from state sequencer 26, commutation control 16 commutates motor 12 by selecting either a fixed value or an appropriate one of the two PWM signals from PWM generator 32 to supply to each of motor terminals U, V, and W. Commutation control 16 also receives information from zero crossings detector 20 about when windows on terminals U, V, and W need to be opened (i.e., when to float these terminals) so that the back EMF signal may be read on terminal U.

Figure 4:
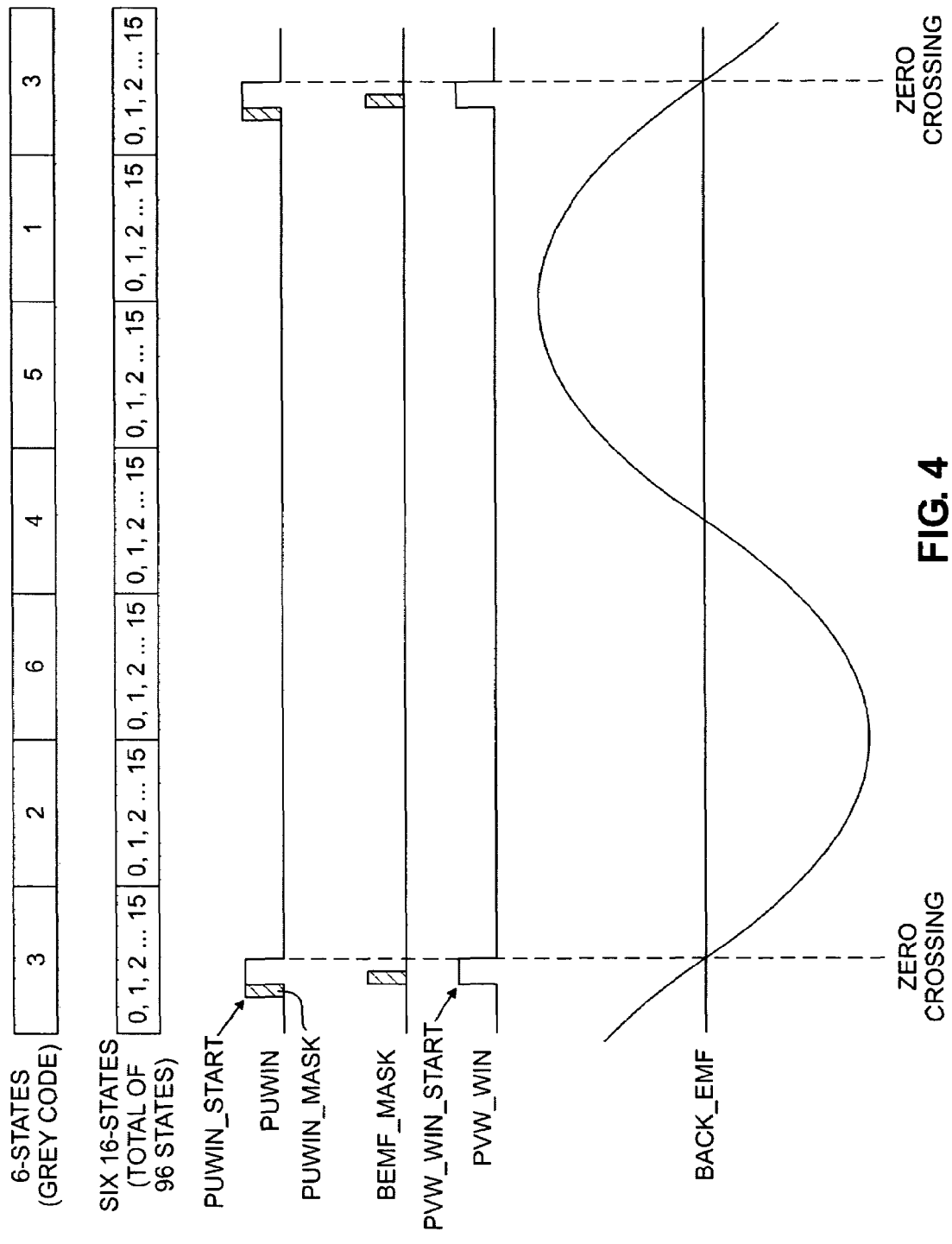
FIG. 4 provides timing diagrams useful for explaining the process used by the digital motor controller of FIG. 1 in opening windows on a motor terminal.

As described above, to correctly detect the back EMF zero crossings of the back EMF signal at a particular motor terminal, commutation control 16 tri-states, or suspends driving, that terminal some time before the zero crossing occurs. FIG. 4 provides timing diagrams useful for explaining the process by which zero crossings detector 20 opens windows on motor terminals U, V, and W. In particular, FIG. 4 illustrates the timing of the six-states, the sixteen-states, the back EMF signal on terminal U, first window signal PUWIN, and second window signal PVW_WIN. Sequential six-states 3, 2, 6, 4, 5, 1 form one electrical period $T_{ROT}$ of motor 12. Each six-state is each divided into sixteen sixteen-states, thus forming 96 sixteen-states.

Zero crossings detector 20 provides first window signal PUWIN to commutation control 16 to control the opening of a window at terminal U. The start of each window (labeled "PUWIN_Start") is a programmable value. Immediately after opening a window at motor terminal U, zero crossings detector 20 will receive transient voltages caused by inductive fly-back in motor 12 that will make the detection of a zero crossing difficult. Accordingly, programmable mask PUWIN_Mask is provided that starts at the same time as each pulse in first window signal PUWIN. While mask PUWIN_Mask is active, detection of back EMF zero crossings is inhibited to allow for the motor current in the winding associated with motor terminal U to decay and settle to zero. The duration of mask PUWIN_Mask is programmable to provide flexibility and to support a wide variety of HDD types. Once a back EMF zero crossing has been detected, zero crossings detector 20 clears first window signal PUWIN. If a back EMF zero crossing is not detected by the end of the six-state in which it is expected to occur (normally six-state 3 as shown in FIG. 4), first window signal PUWIN is cleared and zero crossings detector 20 of FIG. 1 transitions zero crossings signal ZERO_XING to simulate that a zero crossing was detected at the close of the six-state.

During relatively constant speed rotation of motor 12, it is expected that the positive-to-negative zero crossing of the back EMF signal at terminal U will occur during six-state 3. However, during spin up of motor 12, the electrical period $T_{ROT}$ of motor 12 is constantly becoming shorter due to the acceleration of motor 12, thus pushing the zero crossing as early as six-state 1. Thus, during spin-up, the window at terminal U will need to be opened relatively early. As motor 12 approaches its target speed, the window at terminal U can be opened later.

To allow for this variance, zero crossings detector 20 may include a programmable option to automatically adjust the opening of the window to account for a slow down in the acceleration of motor 12. When in automatic mode, if a back EMF zero crossing occurs more than one sixteen-state after mask PUWIN_Mask expires, then the starting time of the next window at terminal U will be advanced by one sixteen-state. If automatic mode is not used, a HDD controller can manually change the starting time of the window.

To minimize the disruption caused by disabling motor terminal U, the window at terminal U should be opened as late as possible. To this end, quarter sixteen-state resolution is provided via the two least significant bits of PHASE signal provided by interval generator 24 to zero crossings detector 20.

Motor terminals V and W are normally being pulse width modulated while zero crossings detector 20 is attempting to detect a zero crossing in the back EMF signal at motor terminal U. Transitions in the pulse width modulations can cause zero crossings detector 20 to sense transient currents, making it difficult to accurately detect back EMF zero crossings. Thus, zero crossings detector 20 may be programmed to provide mask BEMF_Mask immediately following each transition in the pulse width modulations on motor terminals V and W to preclude detection of a zero crossing until the transient currents settle. The duration of mask BEMF_Mask is a programmable time period. Because zero crossings may occur while mask BEMF_Mask is active, the use of mask BEMF_Mask may result in inaccuracies in when the back EMF zero crossing is actually detected. In other words, the transition from a positive back EMF to a negative back EMF may be detected at a time later than the actual zero crossing. Accordingly, it is preferred to minimize the duration of mask BEMF_Mask.

Mask BEMF_Mask may also be programmed to remain active during the entire time that terminals V and W are driven in the same direction. This may be useful during spin up of motor 12 when mutual inductance between the windings associated with motor terminals V and W could result in false zero crossings during current recirculation caused by terminals V and W being driven in the same direction.

When a constant motor speed is desired, and thus the most accurate period measurement is required, it may be beneficial to also open separate window PVW_WIN on motor terminals V and W at a point just before the zero crossing in the back EMF on terminal U is expected. The normal pulse width modulation of terminals V and W will result in one terminal being subjected to a relatively high duty cycle and the other terminal to a relatively low duty cycle. During window PVW_WIN, the terminal subjected to the higher duty cycle will be forced to a high voltage while the other terminal will be forced to a low voltage. By choosing these levels, the distortion caused by opening these windows is minimized.

The use of window PVW_WIN generally will increase the accuracy of the period measurement by motor controller 10 at the expense of a slight disturbance in the waveforms generated at motor terminals V and W. Accordingly, window PVW_WIN is programmable from zero (i.e., no PVW_WIN) to a few quarter sixteen-states. Like window PUWIN, window PVW_WIN is cleared upon the detection of a back EMF zero crossing or the end of the six-state in which the zero crossing is expected to occur. Because window PVW_WIN has a disturbing effect on the commutation of motor 12, it is preferred to minimize its duration. In fact, some HDD types will perform best with use of window PVW_WIN, while others will perform better with a minimal duration of window PVW_WIN, and still others with no window PVW_WIN at all.

The programmable values used by zero crossings detector 20 are provided by an external HDD controller to register WINDOW_SEL accessible by zero crossings detector 20, as shown in FIG. 1.

The above description of motor controller 10 describes its operation during a sinusoidal drive mode. Other operating modes include spin up mode, six-state commutation mode, and coast mode, to name a few. The desired operating mode is provided by an external HDD controller via signal MODES provided to state sequencer 26, PWM generator 32, and commutation control 16 of motor controller 10.

Figure 5:
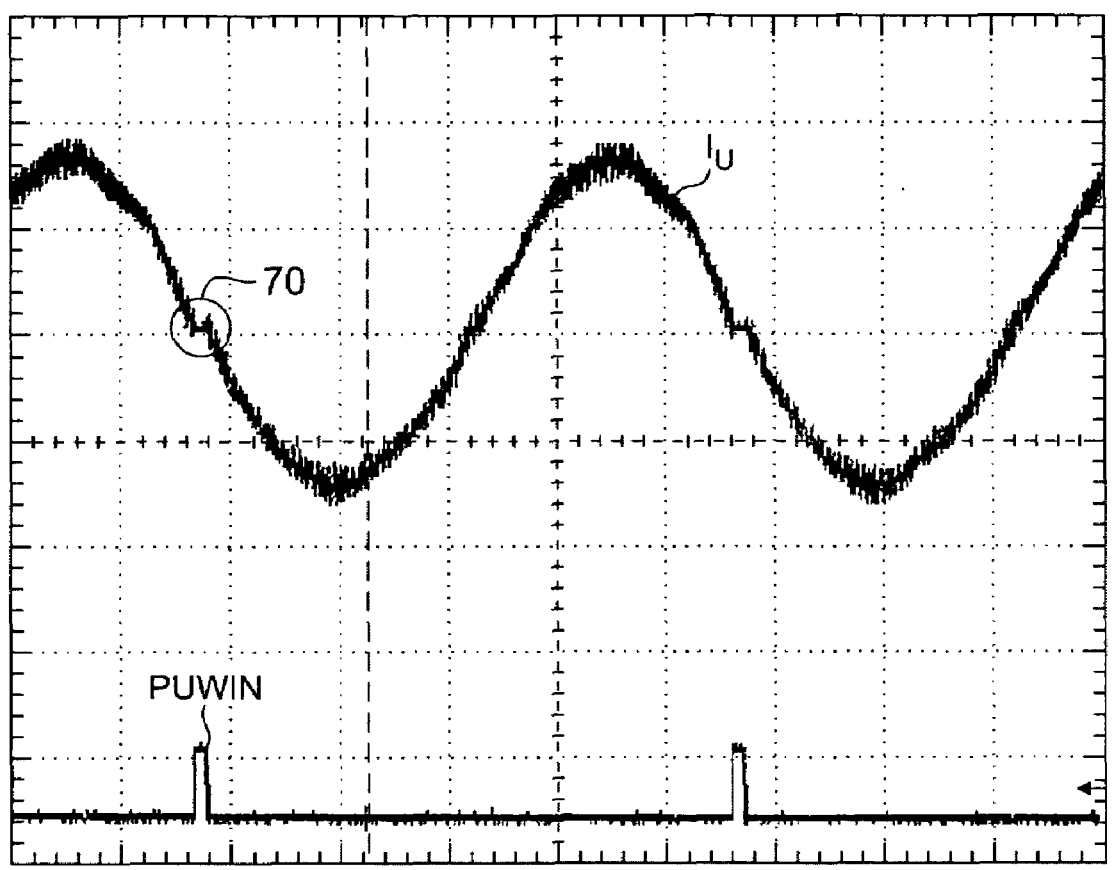
FIG. 5 is a graph plotting both a motor current generated through one phase of a spindle motor by the digital motor controller of FIG. 1 and a window signal.

FIG. 5 is a graph plotting both motor current $I_U$ generated through phase U of motor 12 by motor controller 10 and window signal PUWIN. A small flat spot at point 70 in motor current $I_U$ corresponds to the window opened on motor terminal U, as illustrated by window signal PUWIN. The PWM rate in the example of FIG. 5 is set at 80 KHz, which is programmable by external HDD controller to minimize the ripple seen in the current waveform. The ripple shown in FIG. 5 is outside of the audible range, however, so its amplitude is less important. The overall shape of the waveform remains very sinusoidal, thus resulting in very good acoustic performance.

In summary, the primary function of the digital motor controller described above is to regulate the commutation of a hard disk drive spindle motor, thereby controlling the speed at which the spindle motor is rotated. The motor controller synchronizes the commutation of the motor to the electrical rotation of the motor by first determining the electrical period of the motor. This is accomplished by measuring the time between successive back EMF zero crossings from spindle motor. The back EMF zero crossings are used to continuously make period measurements. These period measurements are then divided into digital intervals used to commutate and pulse width modulate the spindle motor, thus locking the motor controller to the electrical phase and frequency of spindle motor.

The digital motor controller described above essentially replaces the analog phase locked loop approach of the prior art with a simpler digital approach. The digital motor controller requires a reduced number of external components over prior art controllers, thereby having a reduced overall cost. The motor controller described in the present application drives a spindle motor with a sinusoidal current having minimal distortion, thus reducing acoustic noise generated from the torque ripple of the motor. The motor controller also has minimal jitter, or period-to-period fluctuations, that may disturb the read/write electronics. The motor controller described herein is further capable of efficiently and reliably spinning a wide range of spindle motors over a variety of HDD types and market segments.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logical gates and chips that could also be implemented by discrete devices, all within the scope and spirit of the present invention.

The invention claimed is:

1. A method for controlling rotation of a three-phase spindle motor having three terminals, each terminal being driven with a pulse width modulated drive signal, the method iteratively comprising:
   measuring an electrical period of the motor by detecting zero crossings in a back electromotive force signal induced at a first terminal of the motor and determining the time between successive zero crossings;
   determining a rotational position of the motor based upon the last measured electrical period and a location of the detected zero crossing;
   synchronizing the pulse width modulated drive signals with the measured electrical period; and
   wherein the zero crossings are detected by selecting a time window during which the back electromotive force signal is sensed for zero crossings, the time window being selected as a function of the last measured electrical period and the rotational position of the motor.

2. The method of claim 1 wherein selecting a time window during which the back electromotive force signal is sensed for zero crossings comprises:
   opening a first window at the first terminal by tri-stating the first terminal, the first window having a programmable start time and a duration;
   examining the sensed back electromotive force signal to detect a zero crossing while the first window is open; and
   closing the first window upon the earlier of either the detection of a zero crossing or the expiration of the duration of the first window.

3. The method of claim 2 and further comprising:
   simulating a zero crossing upon expiration of the duration of the first window when a zero crossing is not detected while the first window is open.

4. The method of claim 2 wherein the programmable start time of the first window is a specific rotational position of the motor.

5. The method of claim 2 and further comprising:
   activating a first mask having a start time equal to the start time of the first window;
   deactivating the first mask upon expiration of a programmable duration of the first mask; and
   preventing the detection of zero crossings while the first mask is activated.

6. The method of claim 5 and further comprising:
   activating a second mask upon detection of a transition in either of the pulse width modulated drive signal supplied to a second terminal of the motor or the pulse width modulated drive signal supplied to a third terminal of the motor;
   deactivating the second mask upon expiration of a programmable duration of the second mask; and
   preventing the detection of zero crossings while the second mask is activated.

7. The method of claim 6 and further comprising:
   activating a third mask upon detection that a level of the pulse width modulated drive signal applied to a second terminal of the motor equals a level of the pulse width modulated drive signal applied to a third terminal of the motor;
   deactivating the third mask upon detection that the level of the pulse width modulated drive signal applied to the second terminal no longer equals the level of the pulse width modulated drive signal applied to the third terminal; and
   preventing the detection of zero crossings while the third mask is activated.

8. The method of claim 2 and further comprising:
   opening a second window at second and third terminals of the motor by driving the second terminal to a high voltage and driving the third terminal to a low voltage, the second window having a programmable start time and a duration; and
   closing the second window upon the earlier of either the detection of a zero crossing or the expiration of the duration of the second window.

9. The method of claim 1 wherein detecting a zero crossing in the back electromotive force signal induced at a first terminal of the motor comprises:
   comparing a sensed voltage at the first terminal to an average of a sensed voltage at a second terminal of the motor and a sensed voltage at a third terminal of the motor.

10. The method of claim 1 wherein determining the time between successive zero crossings comprises:
    resetting and starting a digital up counter upon the detection of a first zero crossing; and
    capturing an output of the digital up counter in a digital register upon the detection of a second zero crossing, the output being a period digital word representative of the electrical period.

11. The method of claim 1 wherein determining a rotational position of the motor comprises:
    dividing the electrical period of the motor into a plurality of states; and
    incrementing a state sequencer upon the completion of each state, the state sequencer indicating the rotational position of the motor.

12. The method of claim 11 wherein the electrical period of the motor is divided into 96 states.

13. The method of claim 11 wherein the electrical period of the motor is divided into 384 quarter states.

14. The method of claim 11 wherein dividing the electrical period of the motor into a plurality of states comprises:
computing a state digital word representative of a length of each state by dividing a period digital word representative of the electrical period of the motor by the number of states; and
for each state, loading a digital down counter with the state digital word and starting the digital down counter.

15. The method of claim 14 and further comprising:
extending a length of each state to distribute a remainder of the division of the period digital word by the number of states amongst each of the plurality of states.

16. The method of claim 14 and further comprising:
adjusting a length of the first state of the plurality of states to account for an adjustment of phase.

17. The method of claim 1 wherein synchronizing the pulse width modulated drive signals with the measured electrical period comprises:
obtaining a waveform coefficient corresponding to the rotational position of the motor; and
multiplying the waveform coefficient by a digital demand value to obtain a duty cycle control signal for controlling a duty cycle of the pulse width modulated signals.

18. The method of claim 17 and further comprising:
generating a periodic waveform; and
comparing the duty cycle control signal to the periodic waveform to generate the pulse width modulated signals having a duty cycle determined by an amplitude of the duty cycle control signal.

19. The method of claim 18 wherein the periodic waveform is selected from the group consisting of a triangle waveform and a saw-tooth waveform.

20. The method of claim 1 wherein the supply of the pulse width modulated drive signals to the three terminals results in a sinusoidal shaped current in the spindle motor.

21. A method for measuring an electrical period of a three-phase spindle motor having three terminals, each terminal being driven with a pulse width modulated drive signal, the method iteratively comprising:
detecting zero crossings in a back electromotive force signal induced at a first terminal of the motor;
determining a time between successive zero crossings;
determining a rotational position of the motor; and
wherein the zero crossings are detected by selecting a time window during which the back electromotive force signal is sensed for zero crossings, the time window being selected as a function of the last measured electrical period and the rotational position of the motor.

22. The method of claim 21 wherein selecting a time window during which the back electromotive force signal is sensed for zero crossings comprises:
opening a first window at the first terminal by tri-stating the first terminal, the first window having a programmable start time and a duration;
examining the sensed back electromotive force signal to detect a zero crossing while the first window is open; and
closing the first window upon the earlier of either the detection of a zero crossing or the expiration of the duration of the first window.

23. The method of claim 22 and further comprising:
simulating a zero crossing upon expiration of the duration of the first window when a zero crossing is not detected while the first window is open.

24. The method of claim 22 wherein the programmable start time of the first window is a specific rotational position of the motor.

25. The method of claim 22 and further comprising:
activating a first mask having a start time equal to the start time of the first window;
deactivating the first mask upon expiration of a programmable duration of the first mask; and
preventing the detection of zero crossings while the first mask is activated.

26. The method of claim 25 and further comprising:
activating a second mask upon detection of a transition in either of the pulse width modulated drive signal supplied to a second terminal of the motor or the pulse width modulated drive signal supplied to a third terminal of the motor;
deactivating the second mask upon expiration of a programmable duration of the second mask; and
preventing the detection of zero crossings while the second mask is activated.

27. The method of claim 26 and further comprising:
activating a third mask upon detection that a level of the pulse width modulated drive signal applied to a second terminal of the motor equals a level of the pulse width modulated drive signal applied to a third terminal of the motor;
deactivating the third mask upon detection that the level of the pulse width modulated drive signal applied to the second terminal no longer equals the level of the pulse width modulated drive signal applied to the third terminal; and
preventing the detection of zero crossings while the third mask is activated.

28. The method of claim 22 and further comprising:
opening a second window at second and third terminals of the motor by driving the second terminal to a high voltage and driving the third terminal to a low voltage, the second window having a programmable start time and a duration; and
closing the second window upon the earlier of either the detection of a zero crossing or the expiration of the duration of the second window.

29. The method of claim 21 wherein detecting a zero crossing in the back electromotive force signal induced at a first terminal of the motor comprises:
comparing a sensed voltage at the first terminal to an average of a sensed voltage at a second terminal of the motor and a sensed voltage at a third terminal of the motor.

30. The method of claim 21 wherein determining the time between successive zero crossings comprises:
resetting and starting a digital up counter upon the detection of a first zero crossing; and
capturing an output of the digital up counter in a digital register upon the detection of a second zero crossing, the output being a period digital word representative of the electrical period.

31. The method of claim 21 wherein determining a rotational position of the motor comprises:
dividing the electrical period of the motor into a plurality of states; and
incrementing a state sequencer upon the completion of each state, the state sequencer indicating the rotational position of the motor.

32. The method of claim 31 wherein the electrical period of the motor is divided into 96 states.

33. The method of claim 31 wherein the electrical period of the motor is divided into 384 quarter states.

34. The method of claim 31 wherein dividing the electrical period of the motor into a plurality of states comprises:
computing a state digital word representative of a length of each state by dividing a period digital word representative of the electrical period of the motor by the number of states; and
for each state, loading a digital down counter with the state digital word and starting the digital down counter.

35. The method of claim 34 and further comprising:
extending a length of each state to distribute a remainder of the division of the period digital word by the number of states amongst each of the plurality of states.

36. The method of claim 35 and further comprising:
adjusting a length of the first state of the plurality of states to account for an adjustment of phase.

37. The method of claim 21 wherein the supply of the pulse width modulated drive signals to the three terminals results in a sinusoidal shaped current in the spindle motor.

38. A motor controller for controlling rotation of a three-phase spindle motor having three terminals, each terminal being driven with a pulse width modulated drive signal, the motor controller comprising:
period measurement circuitry for coupling to a first terminal of the motor to measure an electrical period of the motor by detecting zero crossings in a back electromotive force signal induced at the first terminal and for determining the time between successive zero crossings;
state dividing circuitry coupled to the period measurement circuitry for determining a rotational position of the motor; and
a pulse width modulation generator coupled to the state dividing circuitry for generating pulse width modulated drive signals that are synchronized with the measured electrical period of the motor, the synchronized pulse width modulated drive signals being provided for coupling to the motor;
wherein the zero crossings are detected by operating the period measurement circuitry and the state dividing circuitry to select a time window during which the back electromotive force signal is sensed for zero crossings, the time window being selected as a function of the last measured electrical period and the rotational position of the motor.

39. The motor controller of claim 38 wherein the period measurement circuitry and the state dividing circuitry are operable to open the time window by tri-stating the first terminal at a programmable start time for a duration, and to close the time window upon the earlier of the detection of a zero crossing or the expiration of the duration of the time window.

40. The motor controller of claim 39 wherein the period measurement circuitry and the state dividing circuitry are operable to simulate a zero crossing upon expiration of the time window when a zero crossing is not detected while the time window in open.

41. The motor controller of claim 39 wherein the programmable start time of the time window is a specific rotational position of the motor.

42. The motor controller of claim 39 wherein the period measurement circuitry and the state dividing circuitry are operable to:
activate a first mask having a start time equal to the start time of the time window;
deactivate the first mask upon expiration of a programmable duration of the first mask; and
prevent the detection of zero crossings while the first mask is activated.

43. The motor controller of claim 42 wherein the period measurement circuitry and the state dividing circuitry are operable to:
activate a second mask upon detection of a transition in either of the pulse width modulated drive signal supplied to a second terminal of the motor or the pulse width modulated drive signal supplied to a third terminal of the motor;
deactivate the second mask upon expiration of a programmable duration of the second mask; and
prevent the detection of zero crossings while the second mask is activated.

44. The motor controller of claim 43 wherein the period measurement circuitry and the state dividing circuitry are operable to:
activate a third mask upon detection that a level of the pulse width modulated drive signal applied to a second terminal of the motor equals a level of the pulse width modulated drive signal applied to a third terminal of the motor;
deactivate the third mask upon detection that the level of the pulse width modulated drive signal applied to the second terminal no longer equals the level of the pulse width modulated drive signal applied to the third terminal; and
prevent the detection of zero crossings while the third mask is activated.

45. The motor controller of claim 38 and further comprising:
comparator circuitry for coupling between the motor and the period measurement circuitry to compare a sensed voltage at the first terminal of the motor to an average of a sensed voltage at a second terminal of the motor and a sensed voltage at a third terminal of the motor.

46. The motor controller of claim 38 wherein the period measurement circuitry comprises:
a digital up counter that is reset and started upon the detection of a first zero crossing; and
a digital register coupled to the digital up counter to capture an output of the digital up counter upon the detection of a second zero crossing, the output captured by the digital register being a period digital word representative of the electrical period.

47. The motor controller of claim 38 wherein the state dividing circuitry comprises:
an interval generator for dividing the electrical period of the motor into a plurality of states; and
a state sequencer coupled to the interval generator, the state sequencer being incremented upon the completion of each state and indicating the rotational position of the motor.

48. The motor controller of claim 38, wherein the pulse width modulation generator comprises:
a lookup table storing waveform coefficients that are retrievable by an index corresponding to the rotational position of the motor; and
a demand multiplier operable to multiply waveform coefficients retrieved from the lookup table by a digital demand value to obtain a duty cycle control signal for controlling a duty cycle of the pulse width modulated drive signals.

* * * * *